United States Patent [19]

Duca et al.

[11] 4,050,704
[45] Sept. 27, 1977

[54] DEVICE FOR MAINTAINING AN UPRIGHT POSITION OF THE BODY OF A HARVESTER-THRESHER MACHINES

[75] Inventors: Mihail Duca; Dan Vasiliu; Teodor Demetrescu; Ion Cimpoiaș, all of Bucharest; Ion Lincă, Bucharest-Otopeni; Stefan Breazu, Bucharest; Virgil Antonescu, Bucharest; Iosif Cojocaru, Bucharest, all of Romania

[73] Assignee: Institutul de Cercetari si Proiectari de Masini Agricole-ICPMA, Bucharest, Romania

[21] Appl. No.: 611,256

[22] Filed: Sept. 8, 1975

[51] Int. Cl.² .................................. B60S 9/10
[52] U.S. Cl. ........................ 280/6 R; 172/395; 267/65 D; 280/707; 280/714
[58] Field of Search ............ 280/111, 707, 709, 714, 280/104, 6 R, 6 H, 6.1, 6.11; 267/65 R, 65 D; 172/395

[56] References Cited

U.S. PATENT DOCUMENTS

| | | | |
|---|---|---|---|
| 3,584,893 | 6/1971 | Tuczek | 280/707 |
| 3,666,286 | 5/1972 | Engfer | 280/707 |
| 3,703,298 | 11/1972 | Laverda | 280/709 |
| 3,747,949 | 2/1973 | Engfer | 280/707 |
| 3,841,653 | 10/1974 | Strauff | 280/709 |
| 3,869,141 | 3/1975 | Ito | 267/65 D |
| 3,873,123 | 3/1975 | Joneleit | 280/707 |
| 3,917,295 | 11/1975 | Hiruma | 280/709 |
| 3,938,823 | 2/1976 | Hiruma | 280/709 |

*Primary Examiner*—Robert R. Song
*Assistant Examiner*—John A. Carroll
*Attorney, Agent, or Firm*—Karl F. Ross

[57] ABSTRACT

A harvester-thresher machine having a body flanked by a pair of hydraulic cylinders for tilting the body of the machine into an upright position in response to a tilt of the harvester-thresher, the cylinders being selectively connected to a source of pressurized liquid whose rate of flow is automatically adjusted in response to the degree of tilt of the machine.

10 Claims, 6 Drawing Figures

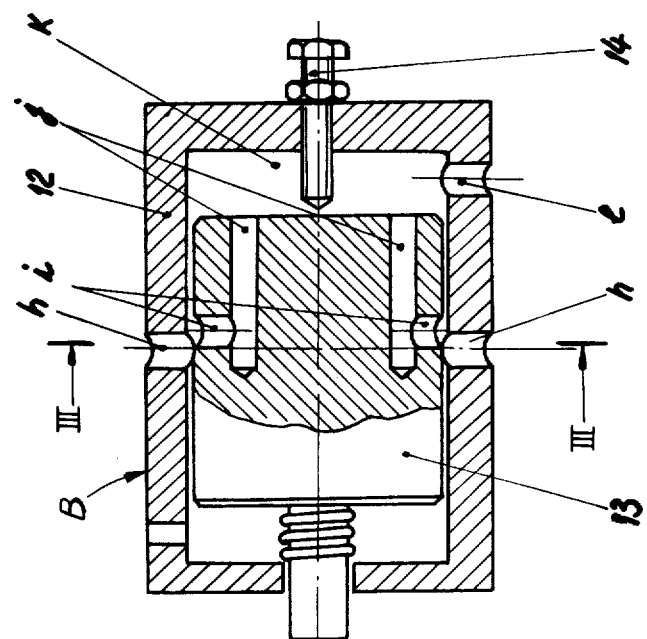
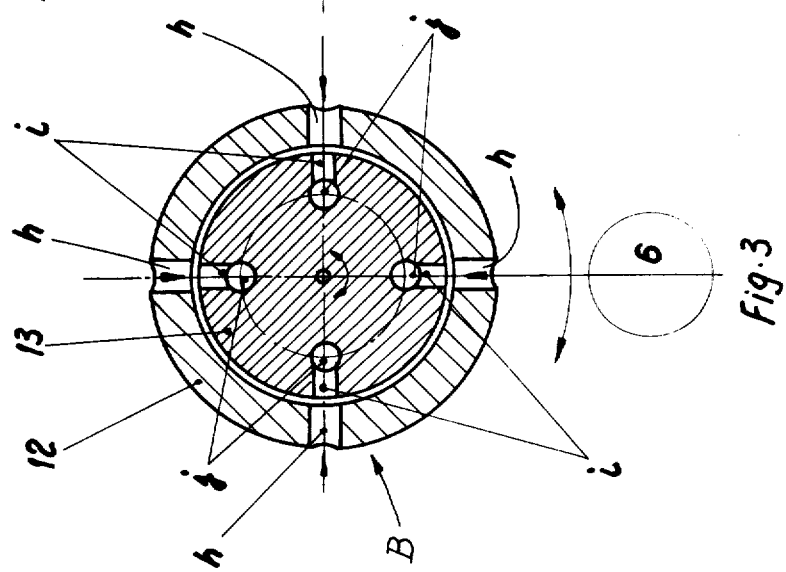
Fig. 4
Fig. 3

4,050,704

DEVICE FOR MAINTAINING AN UPRIGHT POSITION OF THE BODY OF A HARVESTER-THRESHER MACHINES

FIELD OF THE INVENTION

The present invention refers to a device for the automatic continuous maintenance of the upright position of the body of a harvester-thresher for work on slopes, in order to provide optimum operation and stability.

BACKGROUND OF THE INVENTION

A device for harvester-threshers has been known which maintains the upright position of the machine irrespective of the unevenness of the soil. This device senses the tilt of the body by means of two oppositely-acting liquid-filled switches which, by means of control the winding coils of a first electromagnetic valve which in its turn directs the liquid discharged by a pump towards two double action hydrostatic cylinders which bring the machine back into an upright position. The operation of bringing the machine into an upright position is achieved by the device in a selective way, in two steps, namely for small tilts, a part of the flow of the pump, by means of a second electromagnetic valve is short-circuited through a shutter at the tank. The known device has the disadvantage of only two step operation, i.e. with jerks, reduced reliability due to a large number of electric contacts in continuous action, complexity and high factory cost of the components.

SUMMARY OF THE INVENTION

The device for the upright maintenance of the body of the harvester-thresher, according to the invention avoids these disadvantages by achieving a continuously variable speed of restoration to the upright position of the body of the harvester-thresher, a pendulum being provided which transmits the angular variations of the body to a rotary or linear type flow controller which commands an adjustable valve, directing a part from a flow of the pump proportional to the tilting angle of the machine, the flow being attenuated passing through the adjustable valve and then through the flow controller to a reservoir, the other part from the flow of the pump passing through a distributor valve electrically activated, to hydrostatic cylinders which convey to the body of the machine a movement of restoration to the upright position.

BRIEF DESCRIPTION OF THE DRAWING

The above and other features of the invention will now be described in detail with reference to the accompanying drawing in which:

FIG. 3 is a sectional view of the flow controller taken along line III—III of FIG. 4;

FIG. 4 is a longitudinal sectional view of the flow controller of FIG. 3;

SPECIFIC DESCRIPTION

Figure 1:
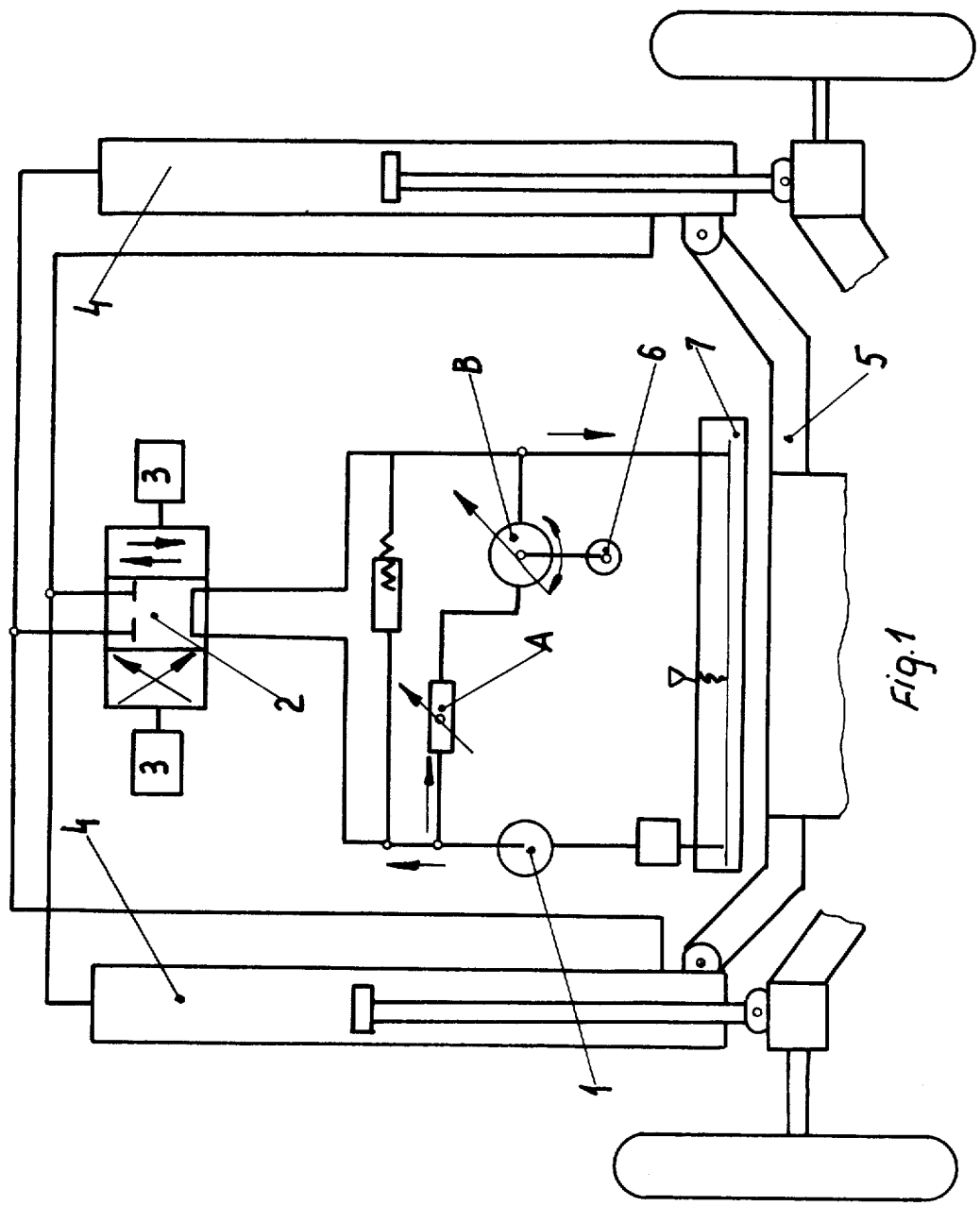
FIG. 1 is a somewhat diagrammatic view of the device according to the invention.
Figure 2:
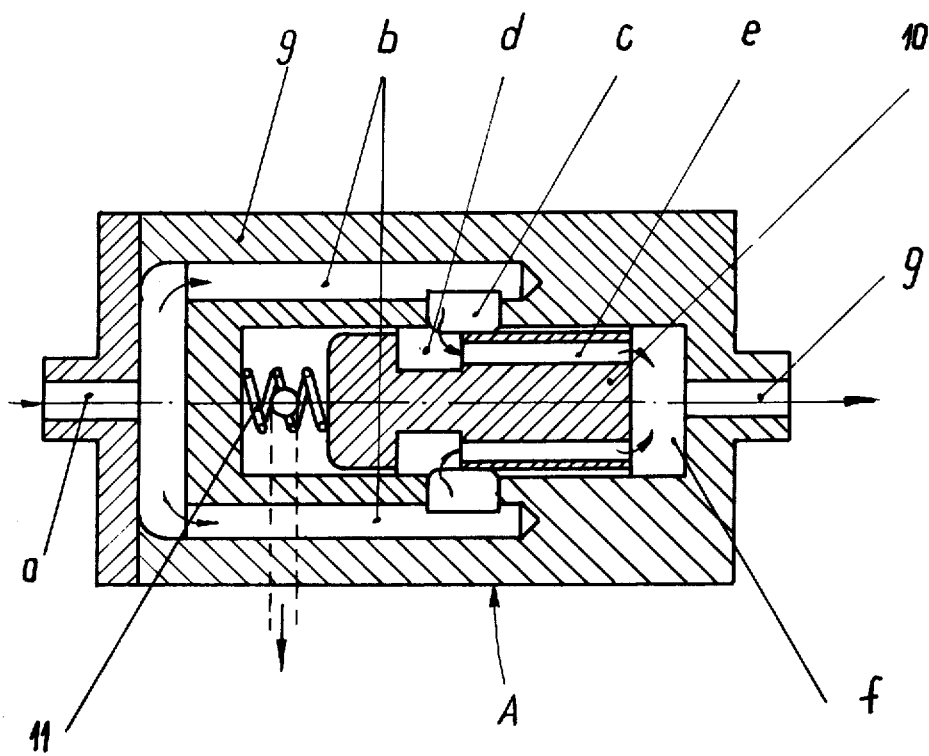
FIG. 2 is a detailed sectional view of the adjustable valve of the device.

The device according to the invention comprises a hydrostatic circuit having a pump 1 whose flow is divided, one branch flowing through a distributor valve 2 activated by electromagnets 3 placed on either side the distributor valve 2, towards two double action hydrostatic cylinders 4, which tilt the body of the machine 5 along its longitudinal axis and the other branch flowing through an adjustable valve A and a flow controller B, directly activated by a suspended pendulum 6, responsive only to the movements around a longitudinal axis of the harvester, towards a reservoir 7. When activating the distributor valve 2 in one of the extreme positions a part of the flow of the pump 1 enters the hydrostatic cylinders 4, causing their corresponding activation, the bringing the machine 5 back to the upright position, the distributer valve 2 coming back center position, locking the hydrostatic cylinders 4. In the extreme positions of the distributor valve 2 in which the hydrostatic cylinders 4 are activated within chosen and adjustable limits, the flow controller B allows the other part of the flow of the pump 1 to pass into the reservoir 7, through the adjustable valve A causing the leveling speed of the body of the machine 5 to be proportional to the devi The adjustable valve A, as more dearly shown in FIG. 2, comprises a body 9 in which a hollow central portion is formed, occupied by a slide 10. An inlet $a$ is formed in one end of the housing 9 and communicates with a pair of channels $b$ which flank the hollow central portion and communicate therewith through ports $c$. The slide 10 is formed with inlets $d$ which feed through channels $e$ in the slide into a chamber $f$ which is formed between one end of the slide 10 and the opposing end of the hollow. An outlet $g$, formed in the body 9, communicates between the chamber $f$ and the flow controller B. When oil is fed through this system under pressure from the continuously operating pump 1, a back pressure is created in the chamber $f$ by the throttling effect of the flow controller B. The inlets $d$, which are normally aligned with the ports $c$, are shifted by the back pressure acting against the slide 10 which in turn compresses a spring 11 seated between the other end of the slide and the opposing wall of the hollow. This misalignment of the ports $c$ and inlets $d$ forms a constriction in the flow path which reduces the rate of flow through this branch of the hydraulic leveling system, in response to the controller B, permitting increased oil flow to the cylinders 4. The shifting of the slide 10 stops when the hydraulic pressure in chamber $f$ and the compressive force of the spring 11 attain an equilibrium position of the slide, the oil flow then being in proportion to a predetermined rate for this particular attitude of the harvester-thresher machine. When the body 5 of the machine is again level, the flow controller B, in response to a pendulum 6, allows the free flow of oil therethrough, reducing the pressure in chamber $f$, allowing the spring 11 to return the slide 10 into an alignment position between its inlets $d$ and the ports $c$. The flow controller B, according to FIGS. 3 and 4 is of the rotary type and can be directly driven by the pendulum 6. The oil enters through the openings $h$ in the cylindrical housing 12 of the flow controller B and into the openings $i$ and $j$ in a rotary body 13, leaving controller B through outlet $e$ in housing 12 and following this path the oil returns to the reservoir 7. When the rotary body 13 is turned to the right or to the left by the pendulum 6, due to the tilt of the machine, the liquid flow is obtu rated proportionally to the revolving angle by means of the variation of the common area of the increasingly misaligned openings h and i. The initial adjustment of the flow passing through the flow controller B is done by means of the bolt 14 which by means of the axial movement of the body 13 alters the superposition area of the openings h and i, and in this way, one can adjust the flow controller B, for example, according to the viscosity or the temperature of the oil used.

Figure 5:
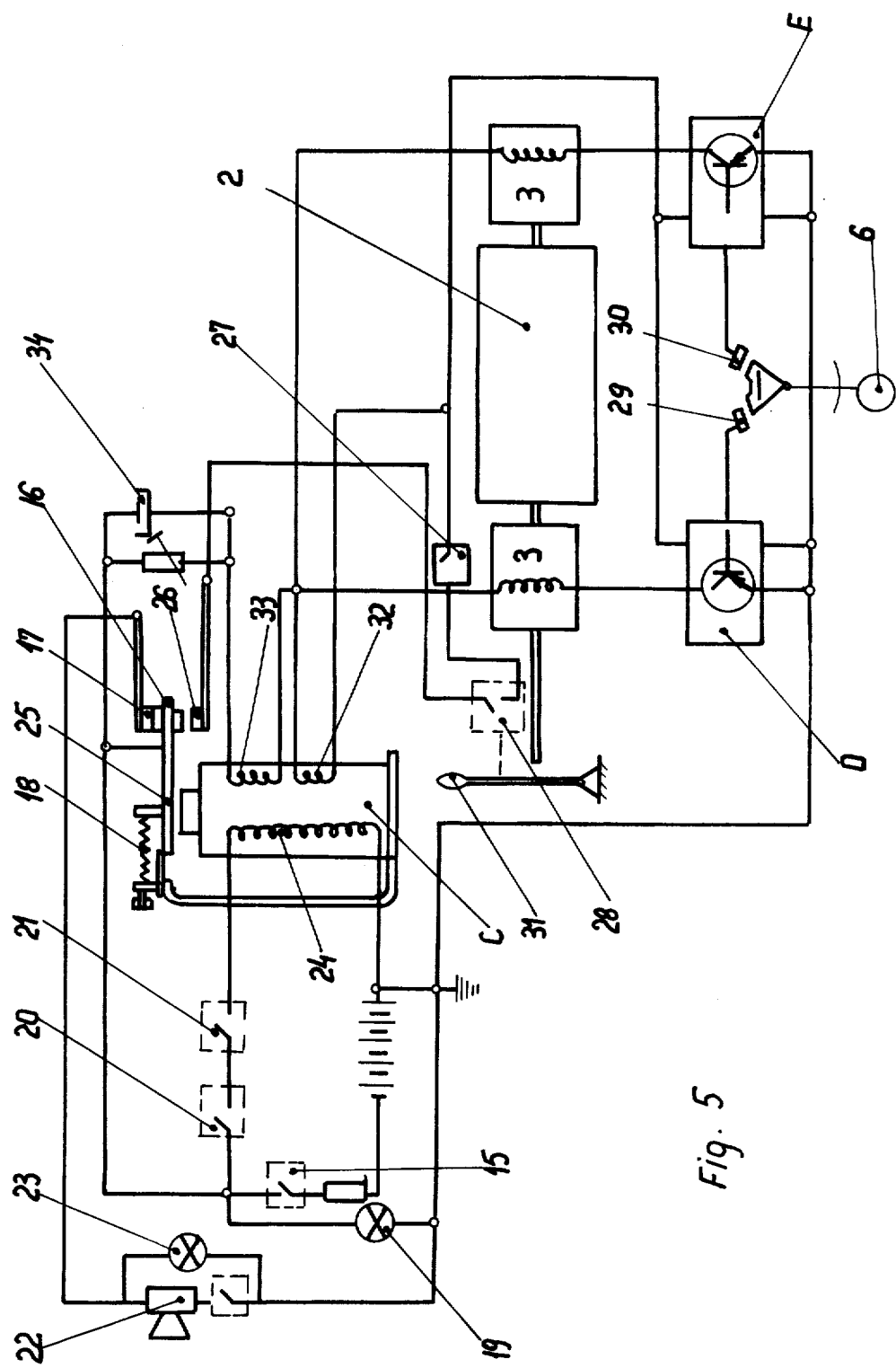
FIG. 5 is a schematic diagram of the electrical circuit used for controlling the distributor valve according to the invention.

The automatic equipment of the harvester-thresher whose fundamental control circuit is presented in FIG. 5 shows the automatic command and control of the hydrostatic equipment. In idle position the power supply of the control circuit is cut out by means of the general switch 15, of the relay C which causes the closing of the circuit made up of the contact 16 and the contact 17, in response to the spring 18. When operating automatically the general switch 15 is turned on, the lamp 19 is lighted signalling the presence of current in the electrical network. If one of the two contacts 20 or 21 limiting the stroke which are normally open is not closed, the relay C is not activated and by means of the contacts 16 and 17, an alarm horn 22 and a lamp 23 are activated. If the contacts 20, 21 limiting the stroke are closed, the winding coil 24 of the relay is energized, the relay C is activated and the armature 25 overcoming the force of the spring 18, establishes the circuit by means of the contacts 16 and 26. A manual-automatic switch 27 sets the automatic position. If the contact 28, normally open, is closed too, when operating automatically, two identical signalling and commanding circuits are energized and they activate respectively the electromagnets 3 and the distributor 2, according to the signals of two transducers 29 and 30. When exceeding the maximum admitted stroke, one of the contacts 20 or 21 is opened, the coil 24 of the relay C is de-energized and the circuit of the alarm horn 22 and lamp 23 is energized by means of contacts 16 and 17. In this case, by opening the contacts 16 and 17, the automatic command is decoupled by putting the respective circuits out of contact and further one can directly and manually activate the slide valve of distributor 2 by means of a lever 31. If during automatic operation something goes wrong, namely there is a short circuit of the coils of electromagnets 3 or the short circuit of both power transistors T1 in the signalling and commanding blocks D and E, which activate the electromagnets 3 of distributor 2, the magnetic field-produced in this case by the winding coil 32 of the relay C, which is opposite to the field produced by the winding coil 24 of the relay C, releases the armature 25 of the relay C, the contacts 16 and 26 are opened and the electric current in the winding coil 32 is annuled. The winding coil 24 being energized, the contacts 16 and 26 close immediately, causing a vibrating movement of the armature 25 of the relay C. When switching on the contacts 16, 26 a winding coil 33 of the relay C, comes into operation, which supplies the charging current of the heavy-duty condenser 34, providing for a while a magnetic field opposite to the field produced by the winding coil 24, thus the spring 18 keeps the contacts 16, 17 closed for a while and the alarm horn 22 and the lamp 23 are activated. After charging the condenser 34, the current in the coil 33 is annulled, the field of the winding coil 24 draws again the armature 25 of the relay C, re-establishing the contact 16, 26 and the process begins again. Intermittent luminous and audio signals are produced, these constituting the signals for damage, and in that case the operator, using the lever 31, manually and directly activates the slide valve of the distributor 2, putting the manual-automatic switch 27 in manual position.

The manual operation is possible in two variants: if the general switch 15 is in the switch on position, the winding coil 24 of the relay C is supplied by means of the contacts 20, 21 limitting the stroke, and thus the ends of the stroke are marked by means of sonorous and luminous signals.

According to the invention, the command of the distributor 2 is achieved by means of the identical signalling and commanding blocks D and E. The tilt of the machine is signalled by the transducers 29 and 30 which commands by means of the power transistors T1 (only one shown) the electromagnets 3 of distributor 2 which directs the oil flow to the hydrostatic cylinders which in their turn bring the body 5 of the machine into an upright position.

Figure 6:
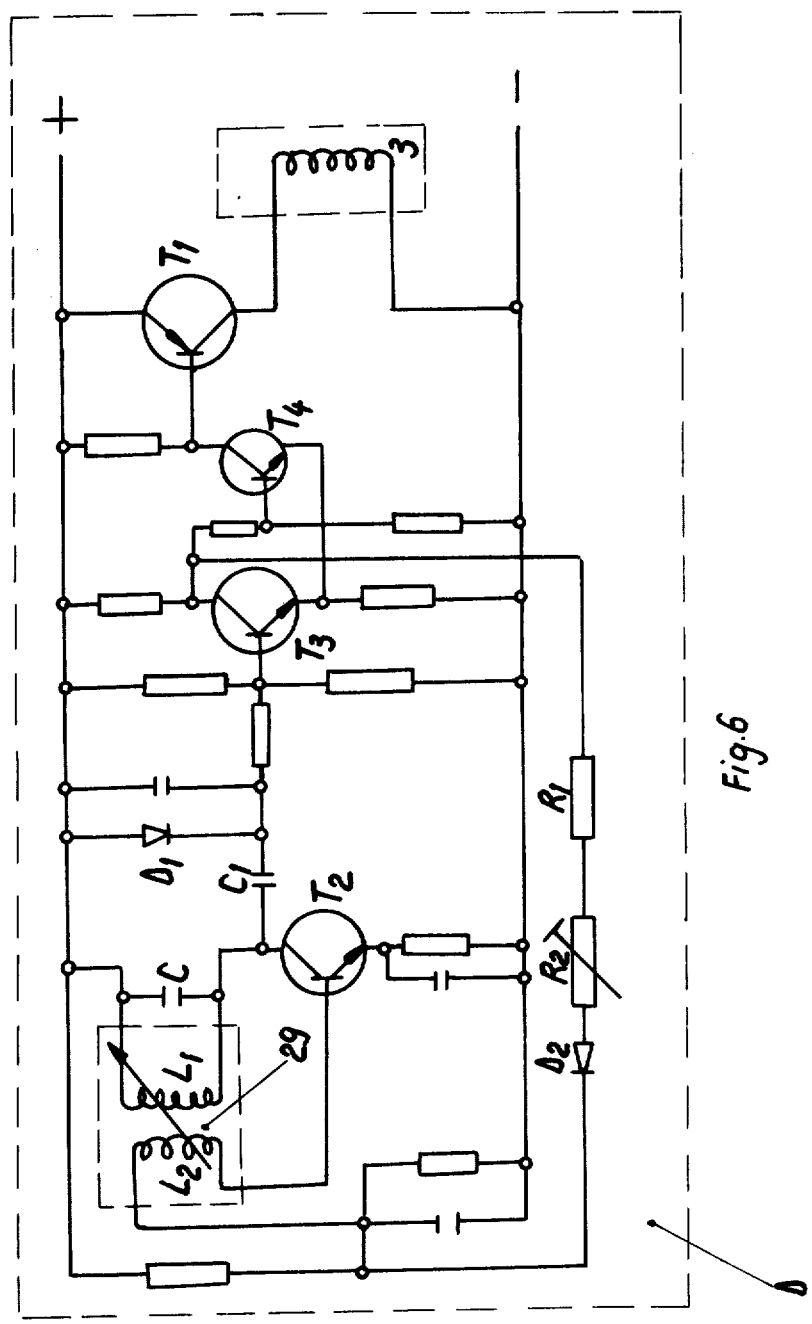
FIG. 6 is a detail of part of the circuit of FIG. 5.

According to the FIG. 6, a transistor T2 is connected to a low-frequency oscillator with in the collector going to a winding-coil L1, and the base to, a winding-coil L2 which make up together the transducer 29. Two transistors T3 and T4 with their respective components make up together a monostable trigger circuit. The transistor T1 is a power transistor which has in the collector the winding-coil of the electromagnet 3. In idle position, the transistor T2 does not oscillate because the shielding of the transducer 29, the shielding forming one piece with the pendulum 6 is removed and the coupling between L1 and L2 is insufficient. In this case the trigger circuit-mentioned above is opened, T4 and T1 are locked and the current does not pass through the winding coil of the electromagnet 3. When the machine is properly tilted, the shielding of the transducer 29 establishes the coupling between L1 and L2 and the transistor T2 starts oscillating. Through a condenser C1, the alternating current in the collector of the transistor T2 passes to a diode D1 which rectifies it and polarizes the base of the transistor T3 in order to lock it, the transistor T3 is tipped-up, namely it is blocked, T4 becomes conductive and through the winding coil of the electromagnet 3, the current passes and activates the distributor 2. When the body 5 of the machine is moved back to the vertical position, the shielding of the transducer 29 which forms one piece with the pendulum 6 is removed, the coupling between L1 and L2 is reduced and the transistor T2 stops oscillating the inverse-grid potential of T3 dissappears, becoming conductive, and T4 and T1 are locked, cutting out the current in the electromagnet 3. In order to bring the machine exactely to the desired vertical position, a circuit R1,R2,D2 was provided which after T2 starts oscillating, polarizes this additionally because of the locking of T3, so that when T2 stops oscillating, this is done to a looser coupling than the starting of the oscillation. Thus, by means of the adjustable resistance R2, the stopping of the oscillation of T2, namely the locking of the hydraulic cylinders 4 of the harvester-thresher is done when the body 5 of the machine is brought back to upright position. For sensing the tilt of the machine, the inductive transducers 29 and 30 are constructed of a ferromagnetic core on which the coils L1 and L2 are mounted and a mobile, ferromagnetic shield which makes one piece with the pendulum 6, and can vary the coupling L1 and L2, so that the transistor T2 may start or stop oscillating. For the transducers 29, 30 various structures can be formed on the basis of the above memtioned principle.

By using the device according to the invention, the following advantages are obtained:
— safe operation
— reduced factory cost
— high reliability

We claim:

1. A device for maintaining an upright position of the body of a harvester-thresher machine comprising:
   a pair of hydraulic cylinders flanking said body for the tilting thereof along a longitudinal axis of said machine;
   a source of pressurized liquid including a continuously operating pump having a constant output;
   means for selectively connecting said source of pressurized liquid to each of said hydraulic cylinders; and
   means automatically responsive to the tilt of said body for adjusting the rate of flow of said pressurized liquid to said cylinders, said means for adjusting the rate of flow comprising:
   a flow controller responsive to the tilt of said body tapping the connection between said pump and said cylinders; and
   an adjustable valve responsive to said flow controller and connected between said controller and said tap, said flow controller comprising:
   a cylindrical housing mounted in said body and having a longitudinal axis;
   a rotary body journaled in said housing and shiftable along said axis;
   a plurality of passageways formed in said rotary body and communicating beween the periphery thereof and one end thereof;
   a plurality of inlets formed in the periphery of said cylindrical housing in alignment with said passageways;
   means on said cylindrical housing for axially shifting said rotary body to misalign said passageways with said inlets for adjusting the rate of flow of said pressurized liquid according to the viscosity thereof;
   a pendulum connected to said rotary body for stabilizing said rotary body during the tilting of said machine and further misaligning said passageways with said inlets for adjusting the flow of said pressurized liquid in response to the tilting of said machine.

2. The device as defined in claim 1 wherein said adjustable valve comprises:
   a housing having a hollow central portion;
   an inlet formed at one end of said housing;
   a pair of channels formed in said housing flanking said hollow central portion and communicating with said inlet;
   a pair of ports formed in said channels and communicating with said hollow central portion;
   a slide provided in said hollow portion forming a chamber between one end of said slide and one end of said hollow portion;
   a pair of passageways formed in said slide for communication between said ports and said chamber;
   an outlet formed at the other end of said housing for communicating between said chamber and said flow controller; and
   a spring between the other end of said slide and the other end of said hollow portion for biasing said slide against a pressure head formed in said chamber in response to said flow controller, said spring and said pressure head moving said passageways in and out of alignment with said ports, providing an adjustment to the rate of flow of said pressurized liquid.

3. The device as defined in claim 1 wherein said means for selectively connecting said source of pressurized liquid to each of said hydraulic cylinders comprises:
   a distributor valve connected between said pump and said cylinders and operable by a pair of electromagnets;
   means responsive to the tilt of said body and connected to said electromagnets for the automatic activation thereof; and
   means for overriding said automatic activation of said electromagnets for the manual operation thereof.

4. The device defined in claim 1 further comprising a relay having a coil and contacts controlled by said coil;
   a warning circuit controlled by said contacts upon operation of said means automatically responsive to the tilt of said body in the absence of correction thereof;
   respective electromagnets energizable for controlling said selective connecting means;
   a transistor connected in circuit with at least one of said electromagnets and with a coil of said relays; and
   circuit means for selectively rendering said transistor conductive and nonconductive.

5. The device defined in claim 4 wherein each of said electromagnets is provided with a respective such transistor and circuit means, each of said circuit means including an inductive transducer and an inverting circuit comprising a pair of transistors between said further transistor and the transistor and circuit with said electromagnet, said transducer forming said means responsive to the tilt of said body.

6. A device for maintaining the upright stance of the body of a harvester-thresher adapted to travel over irregular terrain, comprising:
   a pendulum (6) swingably mounted on said body (5) for assuming different angular positions corresponding to two variations in the angular positions of the body (5) as the harvester-thresher travels over said terrain;
   a flow controller (B) connected with said pendulum (6) and controlled thereby;
   an adjustable valve (A) commanded by said flow controller (B);
   an hydraulic fluid pump (1) connected hydraulically in circuit with said valve (A) and said flow controller (B), said flow controller (B) and said valve (A) bypassing a portion of the fluid delivered by said pump (1) in dependence upon the tilting angle of said body (5) of the harvester-thresher;
   an electrically activated distributor (2) connected to said pump;
   hydrostatic cylinders (4).connected to said body (5) of the harvester-thresher and hydraulically supplied through said distributor (2) with the remainder of the fluid delivered by said pump to displace said body (5) back into an upright position from a tilting position.

7. The device defined in claim 6 wherein said flow controller (B) comprises a rotary slide valve (13) directly operated by said pendulum (6) and having a screw (14) for adjusting the axial position of the rotary slide valve (13), said flow controller (B) further comprises a housing (12) receiving said slide valve (13) and formed with openings (1) aligned with passges (i) formed in said slide valve (13) to a degree determined by the tilting angle of said body (5) of the harvester-thresher.

8. The device defined in claim 6, further comprising circuit means for energizing said electrically activatable distributor (2), said circuit means comprising a relay (C) having a winding coil (24), a pair of stroke-limiting switches (20, 21) in series with said winding coil (24) and with a current-supply battery, said relay (C) further comprising an armature (25);
- a pair of contacts (16, 17) operated by said armature and connected in a warning circuit including an alarm horn (22) and a lamp (23);
- another pair of contacts (16, 26) operated by said armature and connected in circuit with a commutator (27) and a switch (28) for energizing a pair of signaling and commanding units; and means associated with said blocks for energizing control coils of said electrically activated distributor (2).

9. The device defined in claim 8 wherein each of said blocks includes selectively coupleable coils forming an oscillator circuit with a transistor ($T_2$);
- means on said pendulum (5) for controlling the coupling of said coil in response to the tilt of said body;
- output means for said oscillator including a diode ($D_1$) and a condenser ($C_1$);
- another transistor ($T_3$) connected to said output means and forming part of an inversion circuit; and
- a power transistor ($T_1$) connected to said inversion circuit and connected, in turn, with one of the operating coils of said electrically activated distributor.

10. The device defined in claim 6 wherein said pendulum (5) has a core (35) received in the air gap of a pair of inductive transmitters (29, 30) mounted on the body of the harvester-thresher which are activated at predetermined angles of the body simultaneously with the operation of the flow controller (B) by said pendulum (5).

* * * * *